UNITED STATES PATENT OFFICE.

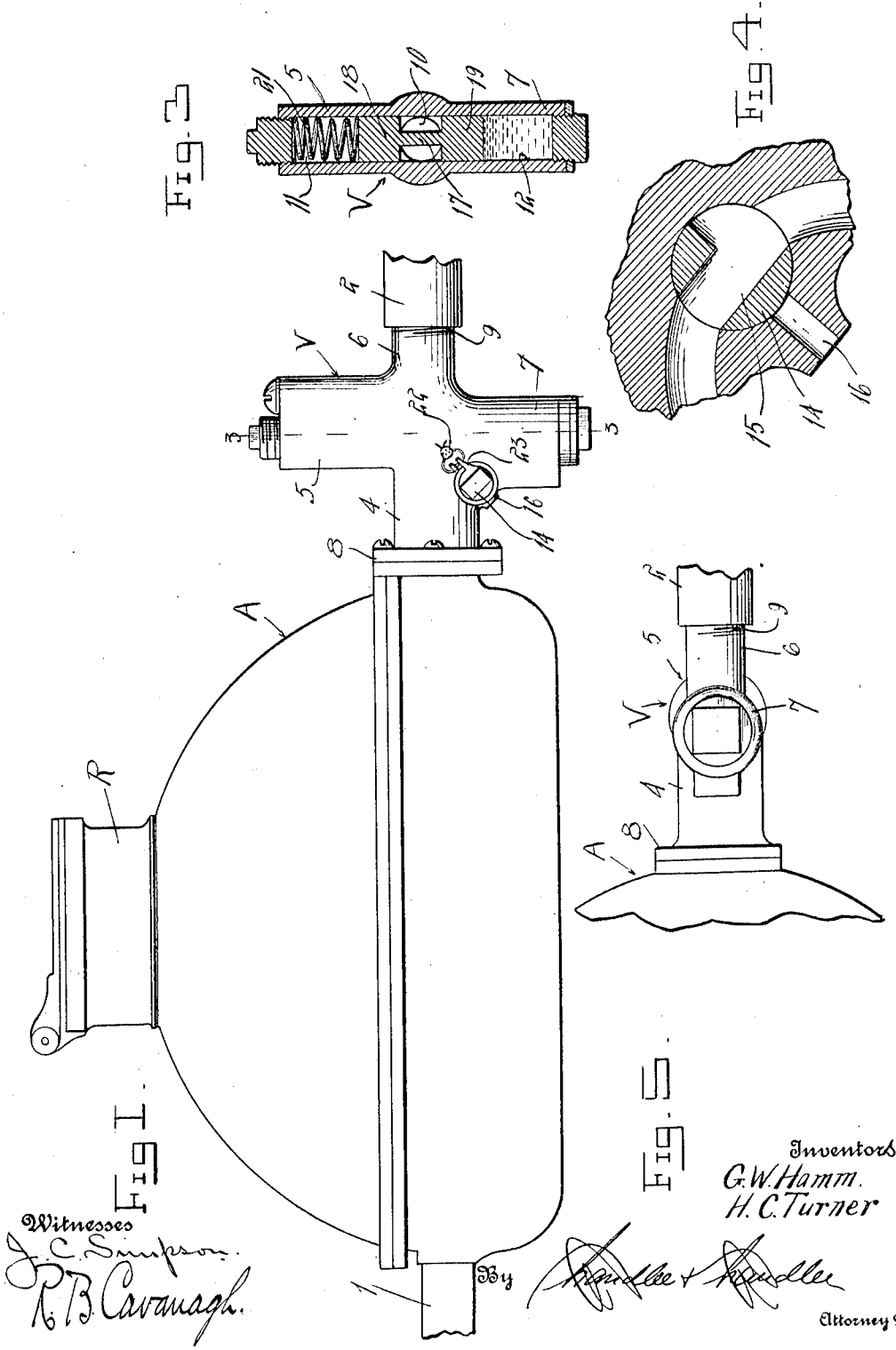

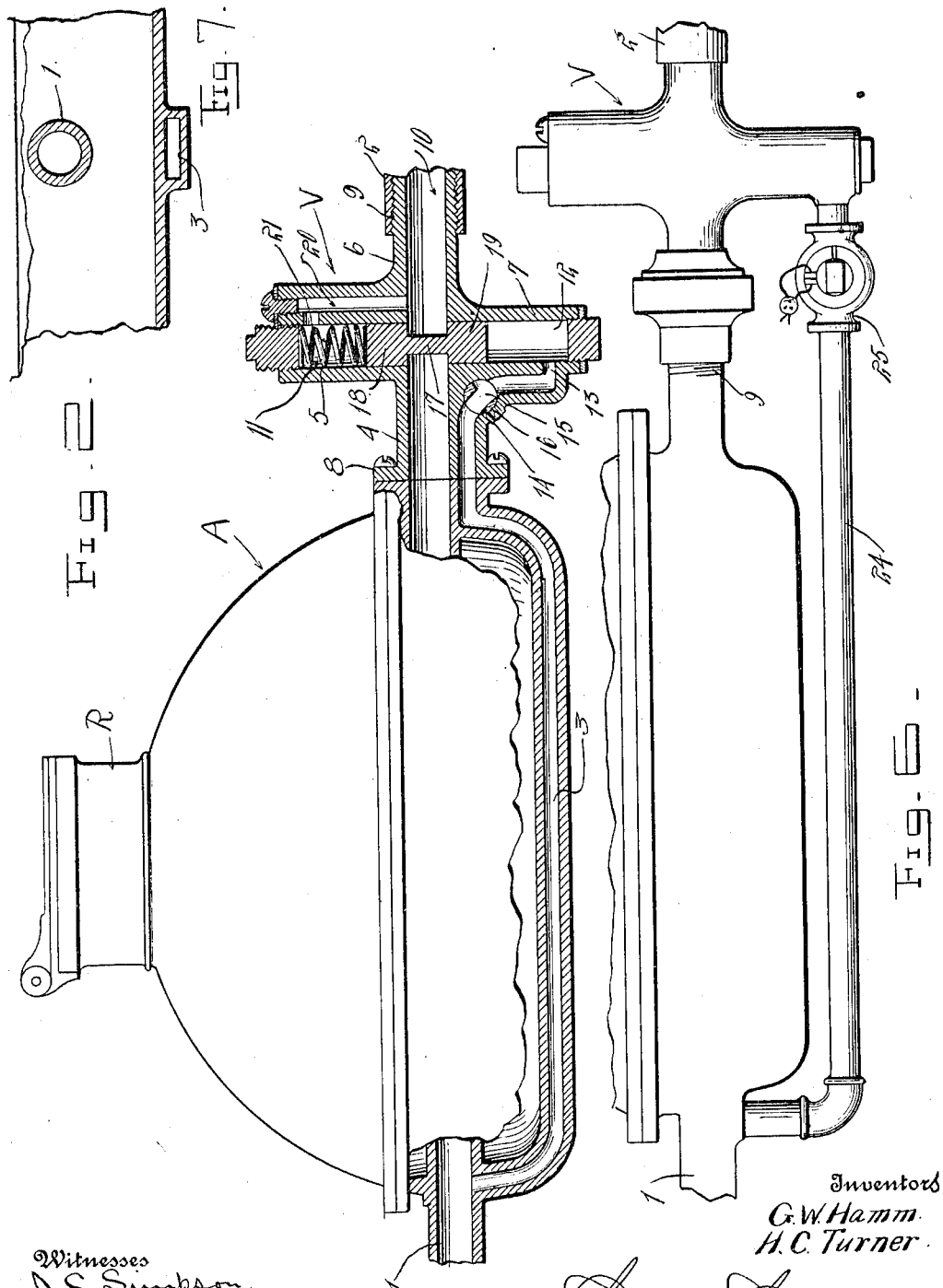

HENRY C. TURNER AND GEORGE W. HAMM, OF REPRESA, CALIFORNIA.

WATER-METER.

1,071,828. Specification of Letters Patent. Patented Sept. 2, 1913.

Application filed September 6, 1912. Serial No. 718,988.

*To all whom it may concern:*

Be it known that we, HENRY C. TURNER and GEORGE W. HAMM, citizens of the United States, residing at Represa, in the county of Sacramento, State of California, have invented certain new and useful Improvements in Water - Meters; and we do hereby declare the following to be a full, clear, and exact description of the invention, such as will enable others skilled in the art to which it appertains to make and use the same.

This invention relates to certain novel and useful improvements in water meters, and has particular application to a meter equipped with means whereby the water supply flowing through the meter to the consumer's line may be cut off in case the meter becomes clogged or deranged to such an extent that it ceases to record the flow therethrough.

Furthermore our invention is designed to prevent hot water working back through the consumer's pipe to the meter and thereby ruining the rotor or turbine which, as is well known, is usually constructed of fiber, and is rendered useless when subjected to the action of the water at a temperature above 160° F.

Still a further purpose of our invention is the provision of a meter of the character referred to in which the mechanism for controlling the flow from the meter to the consumer's line is entirely automatic in its operation.

We further aim to provide a water meter which will embody in its construction the desired features of simplicity and durability coupled with positiveness and efficiency in operation.

With the above recited objects and others of a similar nature in view our invention consists in the construction, combination and arrangement of parts set forth in and falling within the scope of the appended claims.

In the accompanying drawings, like characters of reference indicate like parts in all the views, and Figure 1 is a view in side elevation of a meter apparatus embodying our invention. Fig. 2 is a similar view with our improved valve mechanism and the by-pass of the meter shown in section. Fig. 3 is a vertical sectional view taken through the valve on the line 3—3 of Fig. 1. Fig. 4 is a detail sectional view of the drain cock of the valve. Fig. 5 is a bottom view of the valve and the connection therefor. Fig. 6 is a view in side elevation of a modified form of meter casing wherein the by-pass is located exterior of such casing. Fig. 7 is a view through the meter casing showing the by-pass in cross section.

In water meters of the type to which our invention is particularly applicable, two disadvantages are incident. First, should the meter become clogged or deranged, and thereby cease recording, it still permits a reduced quantity of water to pass through into the consumer's line, although at a low pressure, this water not being recorded by the meter although it may continue to flow to the consumer's line for a considerable period without the company's knowledge and to its consequent loss. Secondly, in case hot water should flow back through the consumer's line into the meter as may occur in case of the building taking fire, the rotor or turbine is liable to be seriously injured or destroyed. Both such disadvantages are avoided by the employment of our invention.

In passing through the meter, water loses from ten to fifteen pounds pressure, and for the purpose of illustrating the operation of our invention we will hereafter consider the pressure on the main at fifty pounds per square inch and the pressure on the consumer's line may then be assumed to be from thirty-five to forty pounds—hence the employment of the terms high pressure and low pressure in this description.

Referring now to the accompanying drawings in detail the letter A indicates a meter of the rotor or turbine type having the usual recorder R. Leading to the meter casing is a water main 1 through which the water enters the meter at high pressure, while 2 indicates the consumer's pipe or line through which the water passes from the meter at low pressure. Interposed between the meter and the consumer's line and communicating with both is our improved valve indicated as an entirety by the letter V. In Fig. 1 the meter by-pass 3 leads through the casing from the main to the valve body, while in Fig. 6 it is shown located out side the meter casing. The valve casing in this structure shown herein is of approximately cross-like form, that is to say, has the four members 4, 5, 6 and 7. The member 4 is flanged at 8 and connected to the meter casing while the opposite member 6 is threaded at 9 into the consumer's pipe or line 2 so that a direct passage 10 for the metered water extends between the meter and the consumer's line. The bores of the vertical tubular arms 5 and 7 of the valve body form chambers 11 and 12 respectively, which communicate with the passage 10. The by-pass 3 communicates with the lower chamber 12 at the point 13 and is controlled by a drain cock 14 having the angular port 15, said drain cock also controlling the drain out-let 16 for a purpose hereinafter described. Movable within the vertical chambers 11 and 12 is the double headed valve 17, the upper head 18 moving in the chamber 11, while the lower head 19 moves in the chamber 12.

The numeral 20 indicates a by-pass or channel angular in form and establishing communication between the passage 10 and the chamber 11, so that the pressure of the metered water bearing upon the top of the valve head 18 will, when supplemented by the action of the spring 21, counter-balance the pressure of water flowing from the by-pass into the lower chamber 12 so that the valve V will remain open, when the meter is working properly, and will occupy the position shown in Fig. 2 permitting the water to flow through the meter to the consumer's line and the flow of that water will also be properly recorded. Now should the meter become clogged or deranged to such an extent that it ceases to record, it may still permit water to seep or flow therethrough at a reduced pressure to the consumer's line. If all the taps of faucets in the building be closed the pressure on the consumer's line still remains at 40 pounds, but as soon as a tap or faucet is opened the pressure will drop to say five pounds. This will release the pressure on the upper head of the piston and allow the high pressure of fifty pounds on the lower head to force the piston valve upward in the casing until the lower head obstructs the passage 10, shutting off the consumer's service until the company is notified and the meter repaired. After the meter has been repaired the service is restored by breaking the seal 22 of the drain cock and giving the handle or arm 23 of the drain cock 14 a quarter turn so that the angular port 15 thereof will communicate with the drain outlet 16, thereby allowing the water in the lower chamber to escape through the drain as the pressure of the spring 21 forces the piston valve down to its usual position. The drain cock is then reopened and resealed and the service restored.

By the use of our invention it is absolutely impossible for water to back into the meter, as for instance in the event the main is being repaired, or there is an excessive demand upon the supply, such as might be caused by fire apparatus pumping for a fire in the vicinity. In either event the absence of pressure on the lower end of the piston valve will allow the greater pressure to be exerted on the upper surface of such piston valve and cause the latter to be forced downwardly in its casing until the upper head 18 obstructs the passage 10. It will remain in this position until the pressure in the main is restored and the valve forced to its normal open position.

In Fig. 6 we have illustrated a slight modified form of the invention, in this structure the by-pass comprising a pipe 24 leading outside the meter from the main to the valve casing and having the drain cock located at the coupling 25 of such by-pass.

While we have herein shown and described the preferred embodiment of our invention, we wish it to be understood that we do not limit ourselves to all the precise details of construction herein illustrated and described, as modification and variation may be made without departing from the spirit of the invention or exceeding the scope of the appended claims.

What we claim is:

1. The combination with a water meter having a high pressure main leading thereto and a low pressure line leading therefrom, of a valve casing in the low pressure line, a piston valve movable in the casing, said casing having a passage or channel leading to one side of the piston, a by-pass leading from the high pressure main to one end of the piston valve, a pressure equalizing element on the other end of the piston valve, and a valve controlled drain port in the valve casing for the by-pass.

2. The combination with a water meter, of a high pressure main leading thereto and a low pressure line leading therefrom, of a valve casing in the low pressure line formed with a high pressure chamber and a low pressure chamber and having a passage extending between the meter and the low pressure line, a double piston valve controlling the passage and having head portions moving in the pressure chambers, a channel extending from the low pressure chamber to the passage in the valve casing, a by-pass connecting the high pressure main with the high pressure chamber, a pressure equalizing spring in the low pressure chamber, and a valve controlled drain port for relieving the pressure in the high pressure chamber.

3. The combination with a water meter, of a high pressure main leading thereto, and a low pressure line leading therefrom, a valve casing in the low pressure line formed with a high pressure chamber and a low pressure chamber and a passage communicating with low pressure line and with the low pressure chamber, a double acting piston valve controlling the passage provided with a head moving in the high pressure chamber, and a head moving in the low pressure chamber, said valve casing having a channel affording communication between the passage and the low pressure chamber, a by-pass leading from the high pressure main to the high pressure chamber of the valve casing, a pressure equalizer spring in the low pressure chamber bearing against the head of the piston therein, and a two-way valve controlling a drain or relief port for the high pressure chamber.

In testimony whereof, we affix our signatures, in presence of two witnesses.

HENRY C. TURNER.
GEORGE W. HAMM.

Witnesses:
JAMES RUSSELL,
HARRY C. TUBRIDGE.

Copies of this patent may be obtained for five cents each, by addressing the "Commissioner of Patents, Washington, D. C."